US011170261B2

(12) United States Patent
Song et al.

(10) Patent No.: US 11,170,261 B2
(45) Date of Patent: Nov. 9, 2021

(54) GLOBAL VISUAL VOCABULARY, SYSTEMS AND METHODS

(71) Applicant: Nant Holdings IP, LLC, Culver City, CA (US)

(72) Inventors: Bing Song, La Canada, CA (US); David McKinnon, San Francisco, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

(21) Appl. No.: 16/732,097

(22) Filed: Dec. 31, 2019

(65) Prior Publication Data
US 2020/0242403 A1 Jul. 30, 2020

Related U.S. Application Data

(63) Continuation of application No. 16/041,695, filed on Jul. 20, 2018, now Pat. No. 10,521,698, which is a (Continued)

(51) Int. Cl.
G06K 9/62 (2006.01)
G06F 16/28 (2019.01)
(Continued)

(52) U.S. Cl.
CPC ....... *G06K 9/6256* (2013.01); *G06F 16/2228* (2019.01); *G06F 16/24* (2019.01);
(Continued)

(58) Field of Classification Search
CPC .... G06F 16/2228; G06F 16/24; G06F 16/285; G06F 16/41; G06F 40/242;
(Continued)

(56) References Cited

U.S. PATENT DOCUMENTS 6,711,293 B1 3/2004 Lowe
7,657,100 B2 2/2010 Gokturk et al.
(Continued)

FOREIGN PATENT DOCUMENTS

CN 101506843 A 8/2009
CN 102063472 A 5/2011
(Continued)

OTHER PUBLICATIONS

Mobile Visual Search Bernd Girod ; Vijay Chandrasekhar ; David M. Chen ; Ngai-Man Cheung ; Radek Grzeszczuk ; Yuriy Reznik ; Gabriel Takacs ; Sam S. Tsai ; Ramakrishna Vedantham IEEE Signal Processing Magazine (Year: 2011).*
(Continued)

*Primary Examiner* — Michael J Vanchy, Jr.
(74) *Attorney, Agent, or Firm* — Mauriel Kapouytian Woods LLP; Elaine K. Lee; Andrew Noble

(57) ABSTRACT

Systems and methods of generating a compact visual vocabulary are provided. Descriptor sets related to digital representations of objects are obtained, clustered and partitioned into cells of a descriptor space, and a representative descriptor and index are associated with each cell. Generated visual vocabularies could be stored in client-side devices and used to obtain content information related to objects of interest that are captured.

20 Claims, 5 Drawing Sheets

Related U.S. Application Data continuation of application No. 15/907,130, filed on Feb. 27, 2018, now Pat. No. 10,049,300, which is a continuation of application No. 14/622,621, filed on Feb. 13, 2015, now Pat. No. 9,922,270.

(60) Provisional application No. 61/939,277, filed on Feb. 13, 2014.

(51) Int. Cl.
  *G06F 40/242* (2020.01)
  *G06F 16/22* (2019.01)
  *G06F 16/24* (2019.01)
  *G06F 16/41* (2019.01)

(52) U.S. Cl.
  CPC ............ *G06F 16/285* (2019.01); *G06F 16/41* (2019.01); *G06F 40/242* (2020.01); *G06K 9/627* (2013.01); *G06K 9/6218* (2013.01); *G06K 9/6255* (2013.01); *G06K 9/6261* (2013.01); *G06K 9/6276* (2013.01)

(58) Field of Classification Search
  CPC .. G06F 16/2455; G06F 16/90; G06F 16/5838; G06F 16/5854; G06K 9/6218; G06K 9/6255; G06K 9/6256; G06K 9/6261; G06K 9/627; G06K 9/6276; G06K 9/4671; G06K 9/6211; G06K 9/6231; Y10S 707/915; Y10S 707/99936; Y10S 707/99943
  See application file for complete search history.

(56) References Cited

U.S. PATENT DOCUMENTS

| | | | |
|---|---|---|---|
| 7,680,341 B2 | 3/2010 | Perronnin | |
| 7,725,484 B2 | 5/2010 | Nistér et al. | |
| 7,783,135 B2 | 8/2010 | Gokturk et al. | |
| 8,139,900 B2 | 3/2012 | Gokturk et al. | |
| 8,370,338 B2 | 2/2013 | Gordo et al. | |
| 8,428,397 B1 | 4/2013 | Brandt | |
| 8,489,585 B2 | 7/2013 | Larlus et al. | |
| 8,630,513 B2 | 1/2014 | Gokturk et al. | |
| 8,712,862 B2 | 4/2014 | Gokturk et al. | |
| 8,732,025 B2 | 5/2014 | Gokturk et al. | |
| 8,768,049 B2 | 7/2014 | Wang et al. | |
| 8,768,313 B2 | 7/2014 | Rodriguez | |
| 8,879,796 B2 | 11/2014 | Serrano | |
| 8,983,201 B2 | 3/2015 | Cai et al. | |
| 9,025,811 B1* | 5/2015 | Ioffe | G06F 16/5838 |
| | | | 382/100 |
| 9,547,807 B2 | 1/2017 | Calleja et al. | |
| 9,552,524 B2 | 1/2017 | Artan et al. | |
| 9,721,186 B2 | 8/2017 | Song | |
| 9,830,631 B1 | 11/2017 | Dhua et al. | |
| 9,864,928 B2 | 1/2018 | Bober et al. | |
| 9,922,270 B2 | 3/2018 | Song et al. | |
| 10,049,300 B2 | 8/2018 | Song et al. | |
| 10,366,306 B1* | 7/2019 | Raghavan | G06K 9/6202 |
| 10,521,698 B2 | 12/2019 | Song et al. | |
| 10,565,759 B2 | 2/2020 | Song | |
| 2007/0217676 A1 | 9/2007 | Grauman et al. | |
| 2007/0260639 A1* | 11/2007 | Tobin | G06F 16/5838 |
| 2008/0212742 A1* | 9/2008 | Hughes | G01V 5/0025 |
| | | | 378/98.12 |
| 2008/0275864 A1* | 11/2008 | Kim | G06F 16/9535 |
| 2008/0301133 A1* | 12/2008 | Brown | G06F 16/9024 |
| 2009/0063431 A1* | 3/2009 | Erol | G06K 9/6293 |
| 2009/0297048 A1 | 12/2009 | Slotine et al. | |
| 2011/0013556 A1 | 1/2011 | Molnar et al. | |
| 2011/0158533 A1 | 6/2011 | Gutelzon et al. | |
| 2011/0286628 A1 | 11/2011 | Goncalves et al. | |
| 2012/0082378 A1 | 4/2012 | Peters et al. | |
| 2012/0106854 A1 | 5/2012 | Tang et al. | |
| 2012/0283574 A1 | 11/2012 | Park et al. | |
| 2012/0330967 A1* | 12/2012 | Vaddadi | G06K 9/6228 |
| | | | 707/743 |
| 2013/0105567 A1 | 5/2013 | Choi | |
| 2013/0129223 A1 | 5/2013 | Takacs et al. | |
| 2013/0202213 A1 | 8/2013 | Adamek et al. | |
| 2014/0015855 A1 | 1/2014 | Denney et al. | |
| 2014/0019489 A1 | 1/2014 | Wang et al. | |
| 2014/0369626 A1 | 12/2014 | Gokturk et al. | |
| 2015/0011194 A1 | 1/2015 | Rodriguez | |
| 2015/0016712 A1* | 1/2015 | Rhoads | G06T 17/00 |
| | | | 382/154 |
| 2015/0043814 A1 | 2/2015 | Gu et al. | |
| 2015/0043828 A1 | 2/2015 | Valente | |
| 2015/0049943 A1 | 2/2015 | Hamsici | |
| 2015/0049955 A1 | 2/2015 | Stoeffler et al. | |

FOREIGN PATENT DOCUMENTS

| | | |
|---|---|---|
| EP | 2 383 680 A1 | 11/2011 |
| WO | 2008/020919 A2 | 2/2008 |
| WO | 2012/156774 A1 | 11/2012 |
| WO | 2013/056315 A1 | 4/2013 |

OTHER PUBLICATIONS

Douze et al., "Combining attributes and Fisher vectors for efficient image retrieval," CVPR 2011—IEEE Conference on Computer Vision & Pattern Recognition, Jun. 2011, 9 pages.
Zobel et al., "Inverted Files for Text Search Engines," ACM Computing Surveys, Jul. 2006, vol. 38, No. 2, Article 6, 56 pages.
Jegou et al., "Triangulation embedding and democratic aggregation for image search," CVPR—International Conference on Computer Vision and Pattern Recognition (2014), 12 pages.
Jegou et al., "Aggregating local descriptors into a compact image representation," 2010 IEEE Conference on Computer Vision and Pattern Recognition (CVPR), 8 pages.
Arandjelovic et al., "Three things everyone should know to improve object retrieval," CVPR '12 Proceedings of the 2012 IEEE Conference on Computer Vision and Pattern Recognition (CVPR), 8 pages.
Spyromitros-Xioufis et al., "A Comprehensive Study over VLAD and Product Quantization in Large-scale Image Retrieval," IEEE Transactions on Multimedia, Oct. 2014, vol. 16, Issue 6, 16 pages.
Arandjelovic et al., "All about VLAD," IEEE Conference on Computer Vision and Pattern Recognition, 2013, 8 pages.
Jegou et al., "Product quantization for nearest neighbor search," IEEE Transactions on Pattern Analysis and Machine Intelligence, Jan. 2011, vol. 33, Issue 1, 14 pages.
Lowe, "Distinctive Image Features from Scale-Invariant Keypoints," International Journal of Computer Vision, Nov. 2004, vol. 60, Issue 2, 28 pages.
Razavian et al., "Visual Instance Retrieval with Deep Convolutional Network," Computer Science—Computer Vision and Pattern Recognition, Dec. 2014, 8 pages.
Sivic et al., "Video Google: A Text Retrieval Approach to Object Matching in Videos," Proceedings of the Ninth IEEE International Conference on Computer Vision (ICCV), 2003, vol. 2, 8 pages.
Winn et al., "Object Categorization by Learned Universal Visual Dictionary," ICCV '05 Proceedings of the Tenth IEEE International Conference on Computer Vision, vol. 2, 8 pages.
Cummins et al., "Probabilistic Appearance Based Navigation and Loop Closing," 2007 IEEE International Conference on Robotics and Automation, 7 pages.
Jegou et al., "Searching in One Billion Vectors: Re-Rank With Source Coding," ICASSP 2011—International Conference on Acoustics, Speech and Signal Processing, May 2011, 4 pages.
Turcot et al., "Better matching with fewer features: The selection of useful features in large database recognition problems," 2009 IEEE 12th International Conference on Computer Vision Workshops (ICCV Workshops), 8 pages.

(56) References Cited

OTHER PUBLICATIONS

International Search Report and Written Opinion issued in International Application No. PCT/US2015/015958 dated Aug. 19, 2015, 14 pages.
Mejdoub et al., "Embedded Lattices Tree: An Efficient Indexing Scheme for Content Based Retrieval on Image Databases," Journal of Visual Communication and Image Representation, Feb. 2009, vol. 20, Issue 2, pp. 145-156.
Mikulik et al., "Learning a Fine Vocabulary," ECCV'10 Proceedings of the 11th European conference on computer vision conference on Computer vision: Part III, 14 pages.
Mikulik et al., "Learning Vocabularies Over a Fine Quantization," International Journal of Computer Vision, May 2013, vol. 103, Issue 1, 13 pages.
Morioka et al., "Building Compact Local Pairwise Codebook with Joint Feature Space Clustering," Computer Vision—ECCV 2010, vol. 6311, 14 pages.
Nister et al., "Scalable Recognition with a Vocabulary Tree," 2006 IEEE Computer Society Conference on Computer Vision and Pattern Recognition, vol. 2, 8 pages.
Philbin et al., "Object Retrieval with Large Vocabularies and Fast Spatial Matching," 2007 IEEE Conference on Computer Vision and Pattern Recognition (CVPR '07), 8 pages.
Philbin, "Scalable Object Retrieval in Very Large Image Collections," PhD thesis from University of Oxford, 2010, 181 pages.
Silpa-Anan et al., "Optimised KD-Trees for Fast Image Descriptor Matching," IEEE Conference on Computer Vision and Pattern Recognition (CVPR 2008), 8 pages.
Girod et al., "Mobile Visual Search," IEEE Signal Processing Magazine, Jul. 2011, vol. 28, Issue 4, pp. 61-76.
Written Opinion issued in Chinese Patent Application No. 201580019658.X dated Aug. 3, 2018, 8 pages.
Office Action issued in Chinese Patent Application No. 201580019658.X dated Mar. 4, 2019, 28 pages.
Office Action issued in Chinese Patent Application No. 201580019658.X dated Jul. 22, 2019, 28 pages.

* cited by examiner

GLOBAL VISUAL VOCABULARY, SYSTEMS AND METHODS

This application is a continuation of U.S. application Ser. No. 16/041,695, filed Jul. 20, 2018, which is a continuation of U.S. application Ser. No. 15/907,130, filed Feb. 27, 2018, which is a continuation of U.S. application Ser. No. 14/622,621, filed Feb. 13, 2015, which claims priority to U.S. Application No. 61/939,277, filed Feb. 13, 2014. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is image recognition and information retrieval technologies.

BACKGROUND

The following description includes information that may be useful in understanding the present invention. It is not an admission that any of the information provided herein is prior art or relevant to the presently claimed invention, or that any publication specifically or implicitly referenced is prior art.

With the advent use of portable devices such as smart phones, tablets, phablets, etc. and applications related to augmented reality, there is an increase in need of fast and accurate recognition of objects based on image data that does not require a lot of memory space. Various efforts have been placed in improving the scope, accuracy, compactness, efficiency or speed of image recognition technologies. For example, "Searching In One Billion Vectors: Re-Rank With Source Coding", by Herve Jegou, Romain Tavenard et al. (International Conference on Acoustics, Speed and Signal Processing, Prague: Czech Republic (2011)) proposes an alternative to the standard post-verification scheme that could require less memory, and is potentially more cost effective. Unfortunately, the proposed efforts suffer various disadvantages, including for example, a slower response time.

As another example, International Patent Application No. 2013/056315 to Vidal et al. describes a method for classifying objects from training images by extracting features, clustering the features into groups of features (visual words), storing visual words with color and texture information, generating a vocabulary tree to store clusters of visual words with common characteristics, and using the trained classification process to classify objects in images.

Similarly, U.S. Pat. No. 7,680,341 to Perronnin describes a method of classifying an image that includes the steps of extracting model fitting data from an image respective to a generative model embodying a merger of a general visual vocabulary and an image class-specific visual vocabulary; "*Video Google: A Text Retrieval Approach to Object Matching in Videos*", by Josef Sivic and Andrew Zisserman describes methods that include a step of building a visual vocabulary from sub-parts of a movie by vector quantization of descriptors into clusters using K-means clustering; "*Object Categorization by Learned Universal Visual Dictionary*", by J. Winn et al., describes clustering using a K-means approach and estimating cluster centres to define a visual dictionary; "*Probabilistic Appearance Based on Navigation and Loop Closing*", by Mark Cummins and Paul Newman discusses that an observation of a scene based on a "bag of words"; U.S. Patent Application Publication No. 2013/0202213 to Adamek et al. describes an offline process wherein a larger number of descriptor examples are clustered into a vocabulary of visual words, which defines a quantization of a descriptor space; and CN 102063472 to Lingyu Duan et al. describes a method in which a client side (1) obtains an image and relevance information, (2) sends the relevance information to a server that searches a vision word dictionary in a vision dictionary library inside the server, and (3) obtains a vision word of the image.

A University of Oxford publication titled "Scalable Object Retrieval in Very Large Image Collections" by James Philbin, published in 2010, discloses to build vocabulary with 500,000 to 1 million words using approximate K-mean algorithm. Philbin discussed that increased vocabulary size does not improve the accuracy of image recognition. Rather, the recognition accuracy depends on database images that are used to build vocabulary.

These and all other extrinsic materials and publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Unfortunately, known efforts apparently fail to optimize the number of descriptors that could be represented by, or associated with, a compact dictionary, and have apparently failed to appreciate that descriptor size impede client-server communication. For example, SIFT descriptors could be up to 128 bytes in size. A smart phone that captures an image might generate several hundred or thousand descriptors resulting in hundreds of kilobytes of data that needs to be transmitted from one device to another. Unfortunately, many smart phones communicate over bandwidth, cost and latency sensitive wireless channels. Sending such relatively large amounts of data over a wireless change negatively impacts the user experience during a recognition activity as well as decrease responsiveness of the devices.

Thus, there is still a need for improved systems and methods of image recognition and content information retrieval.

SUMMARY OF THE INVENTION

The inventive subject matter provides apparatus, systems and methods in which a global vocabulary could be generated to allow thousands, millions or even hundreds of millions of objects to be recognized using a client device (e.g., cell phone, tablet, laptop, kiosk, etc.) storing a dictionary or visual vocabulary of representative descriptors and associated indices in a compact fashion.

One aspect of the inventive subject matter includes a global descriptor vocabulary system capable of generating one or more global vocabulary modules. The system can include a recognition module and a vocabulary generation engine. The recognition module processes one or more digital representations (e.g., images, audio, video, etc.) of objects according to an implementation of a feature extraction algorithm (e.g., SIFT, DAISY, FAST, etc.). The feature extraction algorithm yields one or more descriptor sets across all objects and existing within a descriptor space. The vocabulary engine obtains the descriptor sets and generates clusters of descriptors within the descriptor space. Based on the clustering, the engine further partitions the descriptor space, possibly tessellated, into multiple "cells". Each cell can be assigned a representative descriptor and an index. The representative descriptors and index pair become an entry into a global vocabulary. The engine further instantiates a global vocabulary module as a function of each cell's descriptor and index. For example, if the descriptor space is tessellated into 100,000 cells, the global vocabulary module will have 100,000 descriptor-index pairs. To enumerate 100,000 cells, each index would only require three bytes of data thereby providing a mapping of large descriptors (e.g., 128-byte SIFT descriptors) down to a small size (e.g., 3-byte index)

Another aspect of the inventive subject matter relates to using a global vocabulary in the field. For example, an object data processing system could include a recognition module and a global vocabulary model as referenced above as well as a content identification engine. The recognition module obtains one or more descriptor sets from a digital representation of a test object (e.g., a person, car, mug, poster, television content, etc.) where the descriptor sets exist within the descriptor space. The global vocabulary module comprises a dictionary that translates descriptors in a descriptor space to content indices. The content identification module can submit the descriptor sets to the global vocabulary module, which in turn searches its dictionary to determine which dictionary descriptors are the nearest neighbors to the descriptors in the descriptor set. Once the nearest neighbors are found, the global vocabulary module can return corresponding cell indices to the content identification engine. The content identification engine is programmed to perform the step of constructing a query targeting a content database where the query leverages in the returned indices. In response to the query, the content identification engine can configure to device (e.g., cell phone, tablet, computer, television, appliance, etc.) to receive search results.

Yet another aspect of the inventive subject matter includes building a content database that stores content information according to indices of a global vocabulary. Contemplated systems include a vocabulary generation engine and a content database that is populated with content according to indices from the global vocabulary. The vocabulary engine obtains one or more descriptor sets associated with many different objects, possibly objects from one or more classes or types of objects where the descriptors occupy a descriptor space. Because the descriptor sets can be associated with multiple classes of objects, the global vocabulary can be used universally across multiple domains or categories of objects or object images (e.g., dogs, buildings, cars, people, etc.). For example, a SIFT descriptor space could comprise 128 dimensions. The engine further partitions the space into cells and assigns each cell a representative descriptor and an index as discussed above. It is contemplated that the representative descriptors for the cells may not exist in the descriptor sets obtained by the vocabulary engine, but can be identified by the vocabulary engine as descriptors that make good representation of their corresponding cells. The descriptor-index pairs represent a dictionary for the vocabulary. The content database is programmed to perform the step of receiving object indices related to known objects where the object indices are selected from the dictionary using descriptors derived from digital representations of the known objects. The database further receives content that is to be associated with the known objects and stores the content information by indexing the content according to the object indices. The content information can be retrieved at a later time via the object indices.

Viewed from another perspective, a client device could obtain, and extract features from, a digital representation of a scene including at least one object of interest. The client device could include a dictionary comprising a search tree and assigned indices, and features from the digital representation could be matched to a subset of the assigned indices (i.e., a packet of indices). The packet of indices could be sent to a server storing a plurality of documents (e.g., content information associated with indices and known objects, etc.), along with optional pixel locations associated with the packet of indices. While not limiting to the scope of the inventive subject matter, it is contemplated that each index could comprise 3 bytes of data, and each pixel location could comprise 4 bytes of data such that each feature extracted from the digital representation and sent to the server requires only 7 bytes of data. The server could receive the packet of indices and optional pixel location, and could compute a term frequency-inverse document frequency (tf-idf) score. The server could further use the score to rank the best matched documents to be sent to the client device.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
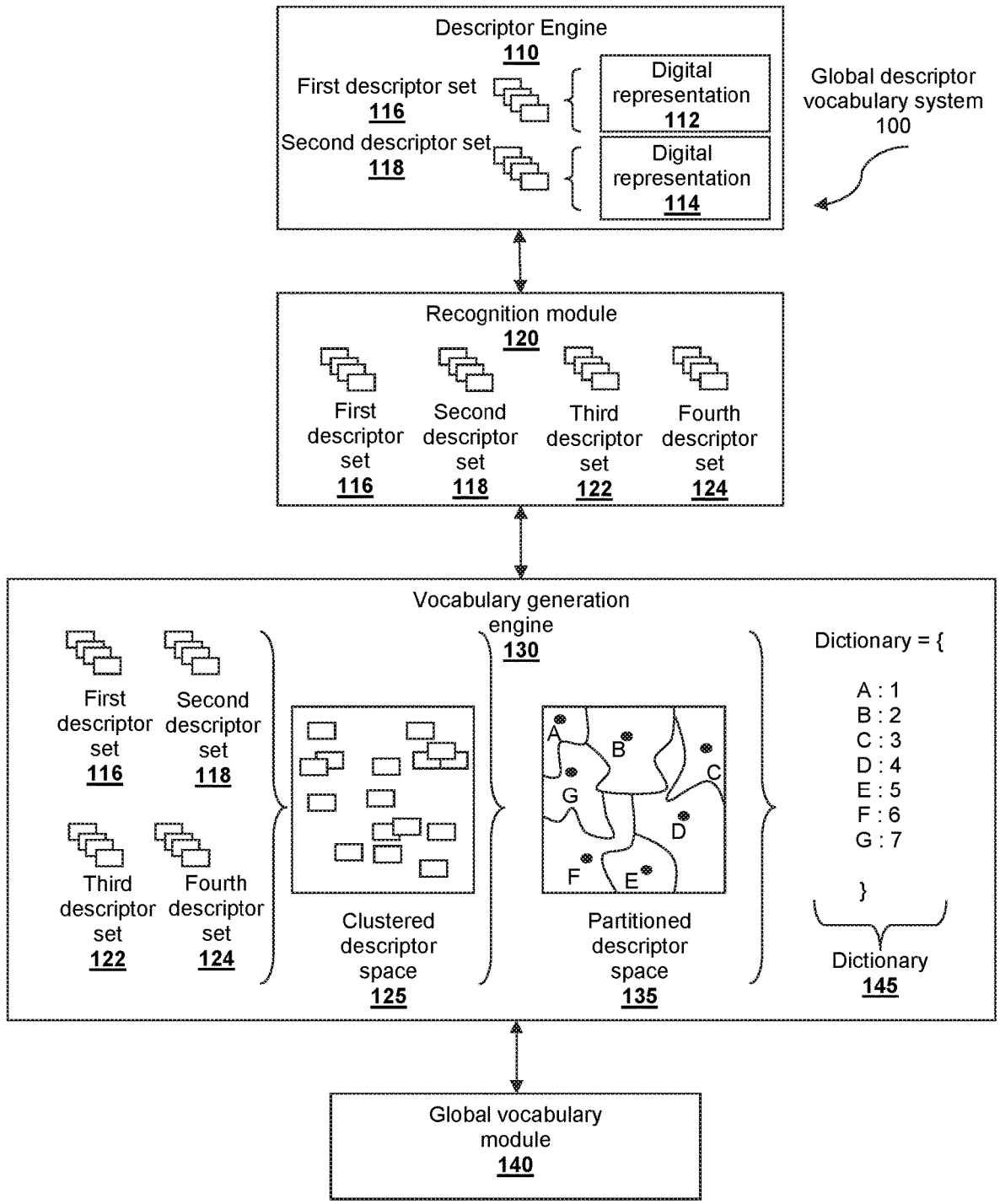
FIG. 1 illustrates a global descriptor vocabulary system of the inventive subject matter.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

As used in the description herein and throughout the claims that follow, when a system, device, engine, or a module is described as configured to perform a set of steps or functions, the meaning of "configured to" or "programmed to" is defined as one or more processors being programmed by a set of software instructions to perform the set of steps or functions or operate according to the instructions.

One should appreciate that the disclosed object recognition system provides numerous advantageous technical effects. Because computer cannot process and recognize image data a priori, the object recognition system is programmed to generate a global vocabulary to improve speed, responsiveness, compactness, accuracy, efficiency, and scope of image recognition. It should be noted that a human would not be able to leverage such a global vocabulary because of the nature of the digital and sheer size of the data involved. Further, human do not possess the ability to detect pixel values of image data as a sensor or device can. Thus, instead of having human to performing essentially impossible task of generating a global vocabulary for image recognition, the object data processing system of some embodiments can generate a global vocabulary to search across multiple domains or categories of images. In addition, the object data processing system of some embodiments allows the content database to be updated with new information (e.g., new content information associated with new known objects are indexed and can be retrieved later), thereby continuously improving the accuracy and scope of object recognition over time.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the inventive subject matter are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in the specific examples are reported as precisely as practicable. The numerical values presented in some embodiments of the inventive subject matter may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints and open-ended ranges should be interpreted to include only commercially practical values. The recitation of ranges of values herein is merely intended to serve as a shorthand method of referring individually to each separate value falling within the range. Unless otherwise indicated herein, each individual value within a range is incorporated into the specification as if it were individually recited herein. Similarly, all lists of values should be considered as inclusive of intermediate values unless the context indicates the contrary.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The focus of the disclosed inventive subject matter is to enable construction or configuration of a computing system to operate on vast quantities of digital data, beyond the capabilities of a human. Although the digital data represents a real-world object, it should be appreciated that the digital data is a representation of one or more digital models of the real-world object, not the real-world object itself. By instantiation of such digital models in the memory of the computing devices, the computing devices are able to manage the digital data or models in a manner that could provide utility to a user of the computing device that the user would lack without such a tool.

Building a Global Descriptor Vocabulary System

One aspect of the inventive subject matter centers on building a global descriptor vocabulary system. Techniques that use visual words to represent features (vocabulary or SIFT descriptors) have been generally used for object search and retrieval. To improve the speed and accuracy of object search and retrieval results, applicants have appreciated that one can optimize the number of images that are used to build a vocabulary dictionary and optimize a size of the vocabulary. When the set of images that is used to build the vocabulary dictionary is large, the applicants have discovered that the accuracy of object search and recognition does not depend on the set of images that is used as the training set. Further, the accuracy of object search and recognition is dependent on the size of the vocabulary such that increasing the size of the vocabulary improves recognition accuracy. Thus, the inventive subject matter includes a vocabulary system, where the vocabulary system has a much larger size of vocabulary than what has been contemplated in the past, for example at least several million vocabularies. Furthermore, the vocabulary is universally used across multiple domains (e.g., different jurisdictions, different locations, different contexts, etc.) or categories of images so that no frequent update of vocabularies is necessary.

In some embodiments of the inventive subject matter, a global descriptor vocabulary system includes a recognition module communicatively coupled to a vocabulary generation engine, and is programmed to perform the step of indexing a plurality of descriptors in a tessellated descriptor space.

In some embodiments, the recognition module is programmed to perform the step of obtaining a plurality of descriptor sets associated with a plurality of digital representations of objects, for example, by receiving the descriptor sets, or by extracting the descriptor sets from the digital representations.

The plurality of descriptor sets obtained by the recognition module could comprise one or more of visual descriptors (e.g., image descriptors, etc.), mono-modal descriptors, multi-modal descriptors (e.g., image descriptors, features, key points, etc.), and a homogeneous mix of descriptors. It is contemplated that the plurality of descriptor sets could have its own descriptor space. It is also contemplated that each descriptor set of the plurality of descriptor sets could have its own descriptor space, or that some of the descriptor sets of the plurality of descriptor sets could exist within a common descriptor space. For example, a SIFT descriptor space could have 128 dimensions where each dimensions has a range of possible values from 0 to 255.

Advantageously, the recognition module that obtains the plurality of descriptor sets is programmed to perform the step of using an implementation of one or more algorithms, including for example, an invariant feature identification algorithm (e.g., SIFT, SURF, FAST, FREAK, BRISK, DAISY, etc.), or any other implementation of a suitable algorithm to interpret and make use of the plurality of descriptor sets, or portions thereof. As an example, consider the SIFT algorithm. Executing an implementation of the SIFT algorithm to image data can result in numerous descriptors, possibly numbering in the hundreds or thousands, if not more. Each descriptor in the set, assuming a 128 dimension SIFT descriptor space, will have 128 data elements, where each element would have a value between 0 and 255.

The vocabulary generation engine could be programmed to perform the step of obtaining the plurality of descriptor sets and cluster the descriptors of the plurality of descriptor sets into regions within a descriptor space. As the descriptor space is finite, the vocabulary generation engine could tessellate or otherwise partition the space into a plurality of cells based on the clustered regions, identify or generate a representative descriptor of each cell, and assign an index to each cell. It is noted that each index can be considered to correspond to a visual word in the vocabulary. The assigned indices could advantageously be less than a descriptor size or less than or equal to 50 bytes, less than or equal to 25 bytes, less than or equal to 20 bytes, less than or equal to 15 bytes, less than or equal to 10 bytes, less than or equal to 7 bytes, less than or equal to 6 bytes, less than or equal to 4 bytes, or even less than or equal to 3 bytes. Consider a scenario where the space is partitioned into 100 million cells. The index space would require at least four bytes to address all 100 million cells. A three byte index would be able to address up to 16 million cells (i.e., $2^{24}$ is about 16.8 million) while a four byte index would be able to address up to 4 billion cells (i.e., $2^{32}$ is about 4.2 billion).

Yet, the reasonable size of index space may not necessarily be 4 bytes or more to improve the efficiency of the vocabulary in a domain-specific manner. Although partitioning the space into a 100 million cells offers fine grained resolution, it should be appreciated that the amount of space required to store a corresponding vocabulary dictionary could require gigabytes of space because the dictionary would comprise 100 millions descriptors; one representative descriptor of about 128 bytes for each cell. Furthermore, the effective size of the vocabulary could be determined empirically based on mean average precision (mAP). For example, even though the index space of 3 bytes supports 16.8 million words, one domain might only require 100,000 words or less to achieve accuracy for that specific domain. Thus, one aspect of the inventive subject matter is considered to include determining a number of desirable cells based one on or more factors, possibly including available memory for a corresponding global vocabulary module, transmission time, object class, or other parameters.

In some embodiments, the vocabulary generation engine could further instantiate a global vocabulary module as a function of the assigned indices and representative descriptors, wherein the indices (e.g., 1, 2, 3, 4, 5, 6, 7, etc.) and representative descriptors (e.g., A, B, C, D, E, F, G, etc.) compose a dictionary that would occupy memory space that is sufficiently small that the dictionary could be stored on a client-side device (e.g., a cell phone, tablet, laptop, kiosk, personal digital assistant, game console, medical device, etc.) having limited memory relative to a server or workstation. A dictionary of the inventive subject matter could also include ancillary data or metadata if desired. It is contemplated that the instantiated global vocabulary module could be configured or programmed to perform the step of generating a set of content indices (associated with content information in a content database) that reference corresponding cells in the descriptor space based on an input set of descriptors (e.g., descriptors extracted from a digital representation or test image, etc.). The descriptors can be image descriptors, edge-based descriptors or other kinds of descriptors as mentioned above. The input set of descriptors could then be used to construct a query (e.g., a packet of content indices, etc.) for submission to the back-end content database (as further described below).

Viewed from another perspective, the global vocabulary module could comprise a vocabulary tree, for example, a K-nearest neighbor tree, a spill tree, a K-d tree, a BSP tree, a quadtree, an octree, a bin, an R-tree, or any other suitable vocabulary tree, which could be used to generate a set of content indices (as further described below) based on a descriptor-based query.

A vocabulary generation engine of the inventive subject matter could be configured or programmed to perform the step of clustering the plurality of descriptor sets using an implementation of one or more algorithms. Contemplated clustering techniques include, for example, histogram binning, K-means clustering, and variations thereof (e.g., K-medians clustering (for choosing medians), K-medoids (restricting centroids to members of a data set), fuzzy C-means clustering (allowing a fuzzy cluster assignment), Gaussian mixture, K-means++ (choosing initial centers less randomly or more selectively), spherical K-means, Minkowski metric weighted K-means, etc.). Further examples can be found in "*Object Retrieval with Large Vocabularies and Fast Spatial Matching*", by Philbin, J. et al., published in CVPR 2007 discussing approximate K-means (AKM), and "*Scalable Recognition With a Vocabulary Tree*", by Nister, D. and Stewenius, H., published at Computer Vision and Pattern Recognition, 2006 IEEE Computer Society Conference discussing hierarchical K-means, which is incorporated herein in its entirety. It should be appreciated that one or more clustering techniques or algorithms could be used for each clustering of a plurality of descriptor sets.

Additionally or alternatively, a vocabulary generation engine could be configured or programmed to perform the step of partitioning a descriptor space based on the clusters through various techniques. In some embodiments, the descriptor space could be partitioned based on Voronoi decomposition or variations thereof (e.g., weighted Voronoi decomposition, approximate Voronoi decomposition, etc.) using the cluster information. It is also possible, subject to descriptor density requirements, to partition the descriptor space into regular spaced cells or cells having a common property. For example, the space could be partition into cell having equal volume, equal descriptor density, equal number of descriptors, or other factors.

FIG. 1 illustrates an embodiment of a global descriptor vocabulary system 100 of the inventive subject matter. System 100 comprises a descriptor engine 110 communicatively coupled to a recognition module 120, vocabulary generation engine 130 and global vocabulary module 140. The descriptor engine 110 is programmed to perform the step of obtaining (e.g., capture, receive, etc.) first descriptor set 116 associated with one or more digital representation(s) 112 of objects, and existing within a descriptor space. Descriptor engine 110 is further programmed to perform the step of obtaining second descriptor set 118 associated with one or more digital representation(s) 114 of objects, and existing within the descriptor space. Preferably all of the descriptors of descriptor sets 116 and 118 exist within the same descriptor space. However, it is also contemplated that some of the descriptors of sets 116 and 118 could exist in different descriptor spaces. For example, some descriptors could fall within a SIFT-defined descriptor space while others fall within a FAST-defined descriptor space. One should also appreciate that there could be multiple descriptor spaces associated with a single algorithm in view that the algorithms can have adjustable parameters. Again, consider the SIFT algorithm as an example. The SIFT algorithm can be adjusted to derive 128-dimension descriptors that might be used on computing devices having higher capacity memory or adjusted to derive 36-dimension descriptors that might be used on computing devices having limited capacity memory where each type of SIFT descriptor could exist within their own space.

Descriptor engine 110 could transmit, and recognition module 120 could receive, first descriptor set 116 and second descriptor set 118 (and any other suitable number of descriptor sets). Recognition module 120 could further be coupled to one or more other engines or devices, and obtain a plurality of descriptor sets (e.g., third descriptor set 122 and fourth descriptor set 124, etc.) there from. It is also contemplated that recognition module 120 could obtain a plurality of digital representations associated with the plurality of descriptor sets, object information, or any other suitable ancillary data. It should be appreciated that descriptor engine 110 and recognition engine 120 can compose the same engine, thus fulfilling roles or responsibilities of both engines.

Additionally or alternatively, the recognition module 120 could obtain a plurality of digital representations (e.g., image 112, image 114, etc.) and extract a plurality of descriptor sets (e.g., 116, 118, etc.) from the digital representations.

Vocabulary generation engine 130 could obtain first descriptor set 116, second descriptor set 118, third descriptor set 122, and fourth descriptor set 124 from recognition module 120, and cluster some or all descriptors from each set into regions within a descriptor space (e.g., via K-means clustering, a variation thereof, etc.) to generate clustered descriptor space 125. For the sake of clarity, cluster descriptor space 125 is illustrated in the figure as a two-dimensional space. However, it should be appreciated cluster descriptor space 125 could comprise any practical number of dimensions. In some embodiments, vocabulary generation engine 130 could also partition the descriptor space into a plurality of cells (e.g., via Voronoi tessellation, etc.) as a function of the clustered regions to generate partitioned descriptor space 135, and assign an index to each cell as a function of representative descriptors of each cell to generate dictionary 145 for possible storing on a client-side device. In the example shown, clustered descriptor space 125 has been partitioned into seven cells as a simple example and as represented by the irregular cells. Although cells are illustrated as having irregular shapes, it is also possible the cells could have regular shapes (e.g., n-dimensional cubes, spheres, etc.). Each of the cells has a corresponding representative descriptor as indicated by descriptors A through G. The representative descriptors could be identified through various methods. In some embodiments, the representative descriptors could be derived as a center of mass of the corresponding cells cluster or the center of a cell shape. Alternatively the representative descriptor could the geometric center of the cell. Still further, the representative descriptor could be an actual descriptor from the ingested descriptor sets and that is closest to the average of all descriptors in the cell.

The example partition descriptor space 135 in FIG. 1 illustrates a mere seven cells. However, in a more practical embodiment, the number of cell could number in the thousands, hundreds of thousands, or even millions. The number of cells can be adjusted to address bandwidth or memory requirements or tailored for efficiency with a specific domain of objects.

Additionally or alternatively, the vocabulary generation engine could instantiate a global vocabulary module 140 programmed to perform the step of generating a set of content indices that reference corresponding cells in the descriptor space based on an input set of descriptors. Global vocabulary modules are further described hereinafter. Global vocabulary module 140 can include some form of dictionary 145. For example, global vocabulary module 140 could include one or more Application Programming Interfaces (APIs) that interact with the corresponding dictionary data structure. Of particular note, module 140 will typically include the representative descriptors as data elements. Thus, if there are 100,000 SIFT descriptors, each represented by 128 bytes, then module 140 will be about 13 MB in size. In embodiments where the indices are also included in dictionary 145 and in module 140, the memory requirements will only increase by small percentage. To continue the previous example, a dictionary of 100,000 descriptors would have indices of three bytes each, which increases the memory requirement by 300 KB, or about 2% of the total size. A module having memory requirements on the order of 10 MB to 20 MB would be considered acceptable for use in a portable device. It is contemplated that finer grained dictionaries, that is dictionaries having a larger number of entries, can also be built as desired. For example, a universal vocabulary having about 2 millions of words would be on the order of 260 MB, although larger such a dictionary is considered to be acceptable for deployment in cell phone-like devices. Global vocabulary module 140 can be installed on a target device, possibly as a module integrated with other applications (e.g., apps, games, productivity applications, web browsers, etc.) or installed on various types of computing devices (e.g., smart phones, tablets, kiosks, appliances, game consoles, medical devices, toys, etc.).

In some embodiments, the global vocabulary comprises a tree structure (e.g., a k-d tree, a spill tree, etc.) that organizes the representative descriptors of the cells within the descriptor space according the tree structure. Such an approach is advantageous in the field where test images fail to generate exact matches to the representative descriptors. For example, a k-d tree can be used to match content objects where there is vast number of content objects possibly matched or indexed by the representative descriptor. The k-d tree starts with a root (the first level) of the tree, where the data is split into two leaf nodes at a threshold value. The global vocabulary module 140 makes a comparison between two split data based on the descriptor, and makes a determination to which first leaf node to descend. The data associated with the first leaf node becomes the first candidate of nearest neighbor of the edge-based descriptor. However, the first candidate of nearest neighbor may not be the true nearest neighbor of the edge-based descriptor. Thus, it is generally required further searches of a plurality of leaf nodes to find the true nearest neighbor, which is the best fit to the query. In some embodiments, the global vocabulary module 140 may limit the number of nodes that can be searched per query. More detailed method of using k-d tree to match content objects is described in "Optimized KD-trees for fast image descriptor matching" by Silpa-Anan et al, which is incorporated herein in its entirety. Thus, the API of the global vocabulary module takes in a descriptor and returns one or more representative descriptors and/or their corresponding indices.

It is also contemplated that Global vocabulary module 140 can have a dictionary with more than a million descriptors; having between 2 to 5 million descriptors is considered useful. In this scenario, it should be appreciated that the amount of space required to store a corresponding vocabulary dictionary as SIFT descriptors could require approximately 200 MB to 300 MB of storage space.

Using the Global Vocabulary Dictionary

In some embodiments of the inventive subject matter, an object data processing system comprises a recognition module communicatively coupled to a global vocabulary module and a content identification engine, and allows a user to obtain content information related to one or more test objects captured in a digital representation.

Viewed from another perspective, a recognition module could be programmed to perform the step of obtaining one or more descriptor sets (e.g., via extraction or an image capturing device coupled thereto, etc.), each descriptor set being associated with a digital representation of a test object and existing within a descriptor space. A global vocabulary module could be programmed to perform the step of obtaining the one or more descriptor sets from the recognition module (or intermediate module) and generate a set of content indices based thereon. For example, the global vocabulary module can include a dictionary of representative descriptors along with corresponding indices. The descriptor sets can be submitted to an API of the global vocabulary module and in response the API can return a result set of content indices that corresponding to representative descriptors that are considered nearest neighbors within the descriptor space to the input descriptors.

The content indices could advantageously reference corresponding cells in the descriptor space, and be used in identifying content information (e.g., digital content, advertisements, promotions, light, a URL link, image, text, video, web address, webpage, audio, review, games, television programming, medical records, legal documents, genomic data, etc.) associated with one or more of the test objects. For example, a content identification engine could be programmed to perform the steps of obtaining the set of content indices from the global vocabulary module, constructing a query targeting a content database as a function of the set of content indices, and configuring a cell phone or other device (e.g., a tablet, a computer, a server, a terminal, a television, etc.) to obtain a search result in response to submitting the query to the content database.

In some preferred embodiments, each of the assigned indices could be less than or equal to three bytes, which requires much less data-storage capacity than a descriptor (e.g., SIFT features are described with 128-byte vectors, etc.). Moreover, as a single representative descriptor (e.g., 128-bytes, etc.) and assigned index (e.g., 3 bytes, etc.) in a dictionary could be representative of 5, 10, 15, 20, 25, 100, 150, 200, or even 500 or more descriptors of a descriptor space tile, the compactness of dictionaries that can be stored in client-side devices is highly advantageous.

One should appreciate that the number of indices and associated representative descriptors included in a dictionary could depend on various factors as discussed previously, including for example, type of client-side device, type of objects to be identified using the dictionary, or any other suitable factors. There is generally a tradeoff between the level of object differentiation that can be provided and the amount of memory used or required. Viewed from another perspective, the less memory required by a dictionary, the less object differentiation provided by the dictionary, all else being equal. Therefore, it is important to determine where to strike the balance by considering the various applicable factors. For example, where the client-side device comprises larger storage capacity, the amount of memory used or required by a dictionary to be stored therein could be less restricted. As another example, wherein the dictionary is intended to be used to identify a plurality of objects that are similar in shape, size, color or other dimensions, the importance of object differentiation capabilities could outweigh the importance of compactness. In such instances, a client-side device comprising a larger storage capacity, or a dictionary intended to identify a fewer number of objects may be required.

A query used to search a content database could be constructed in any suitable manner including, among other things, using tf-idf functions, a term frequency ranking function, a constant ranking function, an Okapi BM25 ranking function, a machine-learned ranking function (e.g., SVM classifier, etc.), or other similar functions. A constructed query can comprise, among other things, a packet of indices related to an object and identified via a dictionary stored in the cell phone or other device. It is contemplated that the packet of indices could include some or all content indices of the set of content indices obtained by the content identification engine.

It is also contemplated that the content identification engine could be programmed perform the step of refining a query in any suitable manner to increase a likelihood that the most relevant content information is returned to a user. For example, the query could be refined by suppressing common content indices, thereby minimizing the amount of data sent to a content database, and possibly increasing efficiency of an object data processing system. As another example, the query could be refined by filtering the content indices based on spatial consistency. This method could be considered similar to a search engine increasing a ranking of a document where two or more searched words appear closer together. The query can also include additional context information or metadata to aid in reducing false positives in the result set. Example metadata could include device or user location, time, intent, user profile, user persona, device motion or heading, device facing, orientation, history, or other parameters.

Once the query (or refined query) is used to search the content database (e.g., a search engine, etc.), content information (search result) associated with one or more test objects could be returned to the device in any suitable format. In some embodiments, the search result(s) can further be verified by the content identification engine (or other engine). For example, a search result can be verified using location information through a geometric constraint.

The search result or content information is preferably related to at least one test object (e.g., an image of a test object, a video of a test object, a link to purchase the test object, an audio embodied in the test object, etc.), and associated with the packet of indices based on any suitable set of rules, including for example, a best match or a threshold match. In some embodiments, the content database could further comprise a plurality of indices or packets of indices (or information related thereto), wherein each packet of indices could be associated with at least one piece of content information and a known object.

It should be appreciated that the content identification engine, recognition module, global vocabulary module and content database could be stored in any suitable location(s). For example, the recognition module and dictionary could be located in a client-side device (e.g., cell phone, tablet, computer, server, terminal, kiosk, television, etc.), and a global vocabulary module, content identification engine and content database could be stored on one or more servers located at least 1 mile, at least 5 miles, at least 10 miles, at least 100 miles, or even 1,000 miles or more away from the client-side device.

Figure 2:
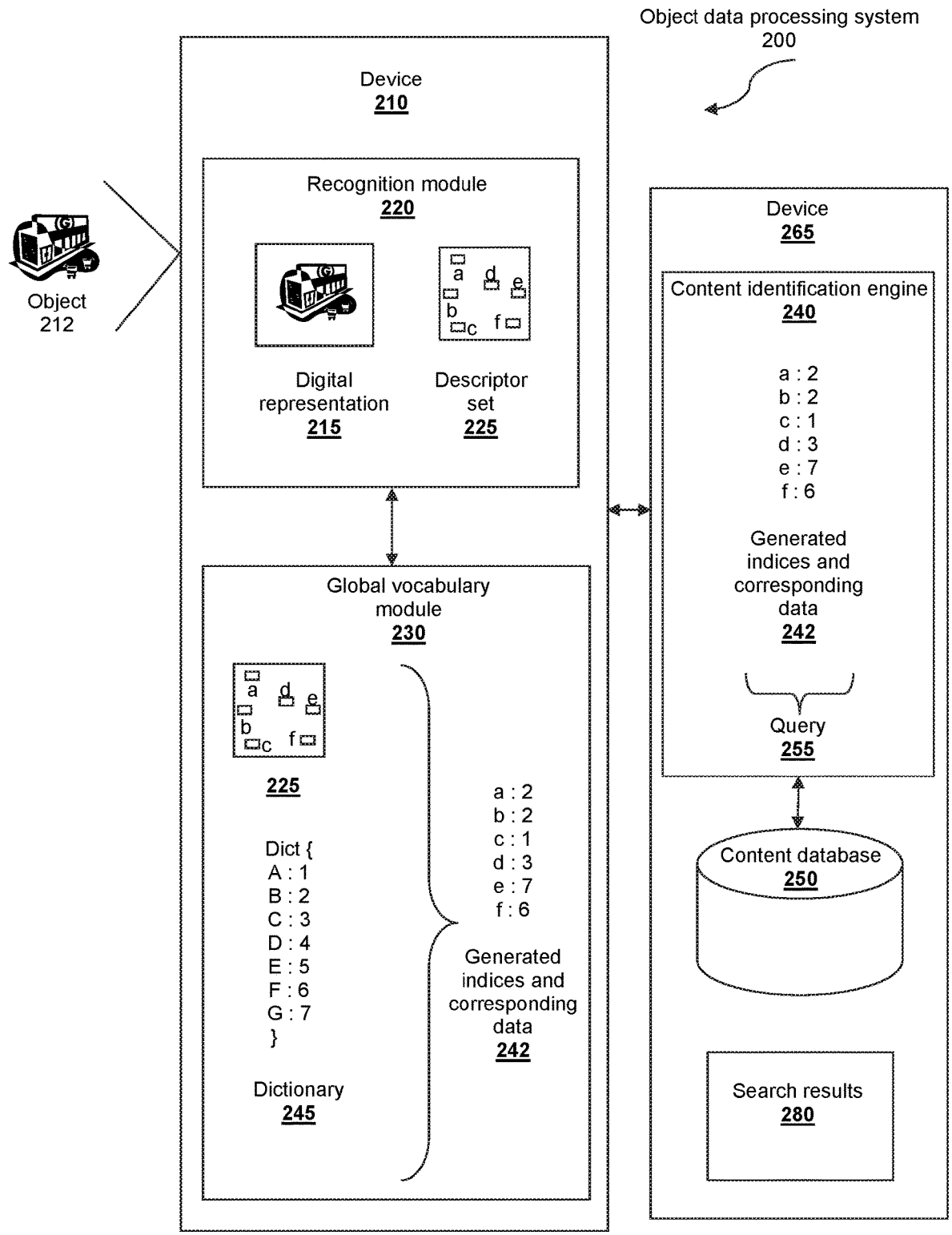
FIG. 2 illustrates an object data processing system of the inventive subject matter.

FIG. 2 illustrates an embodiment of an object data processing system 200 of the inventive subject matter. System 200 comprises a first device 210 comprising a recognition module 220 and a global vocabulary module 230 as discussed above. System 200 further comprises a second device 265 communicatively coupled to first device 210, and comprising content identification engine 240, and content database 250. It should be appreciated that first device 210 and second device 265 could comprise the same device.

First device 210 could comprise a mobile device, and could be programmed to perform the step of capturing a digital representation 215 of a scene including at least one object 212 (e.g., a face, a document, a credit card, a toy, a machine, a vehicle, a building, etc.). Recognition module 220 composing or communicatively coupled to first device 210 could then analyze digital representation 215 and extract there from a descriptor set 225 (e.g., a-f, etc.) existing within a relevant descriptor space. It should be appreciated that while the descriptor spaces shown herein are two dimensional, descriptor spaces having any suitable number of dimensions is contemplated (e.g., 3-dimensional, 4-dimensional, 5-dimensional, 8-dimensional, 128-dimensional, etc.).

Upon extraction or receipt of descriptor set 225, recognition module 220 could send descriptor set 225 and any other descriptor sets associated with objects to global vocabulary module 230. Global vocabulary module 230 could be programmed to perform the step of obtaining the descriptor set 225, and uses a dictionary 245 (comprising indices associated with representative descriptors of a partitioned descriptor space) to generate a set of relevant content indices 242 having values that reference corresponding cells and representative descriptors (e.g., A-G, etc.) in the partitioned descriptor space. In the example illustrated, the generated indices are shown as associated with extracted descriptor set 225 of digital representation 215. It should be appreciated that the lower case letters "a" through "f" are considered distinct descriptors from representative descriptors A through G. For example, representative descriptor B in dictionary 245 might be the nearest neighbor to descriptor "a" from descriptor set 225. Therefore, global vocabulary module 230 will return an index of "2" (i.e., the cell index that corresponds to representative descriptor A).

Additionally or alternatively, some or all of the steps carried out by global vocabulary module 230 could be carried out by recognition module 220. Device 210 could then transmit the generated set of indices 242 to device 265, which comprises content identification engine 240. Content identification engine 240 could be programmed to perform the steps of obtaining the set of content indices 242, and constructing a query 255 targeting a content database 250 as a function of the set of content indices 242. The search results 280 from the query could be displayed on device 265 or any other suitable interface and device.

Building a Content Database that Indexes Content Based on Global Vocabulary Indices In some embodiments of the inventive subject matter, a content indexing system comprises a vocabulary generation engine communicatively coupled to a content database storing or configured to store content information. The content information can include a broad spectrum of content including many different data modalities. Example content information can include network addresses, videos, audio, images, promotions, coupons, account information, identity information, or other types of information. The vocabulary generation engine could be programmed to perform the step of obtaining a plurality of descriptor sets existing in a descriptor space, partition the relevant descriptor space into cells as a function of the descriptor sets, and assign an index to each cell as described above. The content database could be programmed to perform the step of receiving the assigned indices or subset thereof (object indices), which could be associated with known objects. It should be appreciated that descriptors of the plurality of descriptor sets could be used to determine which indices belong to which known object.

In some preferred embodiments, the content database could further be programmed to perform the steps of receiving content information associated with the known objects and storing the content information on a computer readable media by indexing the content information using the object indices. It is contemplated that the content database could index the content information in any suitable manner, including for example, according to a schema that adheres to the descriptor space.

Additionally or alternatively, the content database could be programmed to perform the steps of receiving a query (e.g., from a content identification engine (e.g., 240), etc.) and generating a search result comprising relevant content information as a function of a query descriptor set or indices. The search result could be sent to a device, for example, the device submitting the query to the content database, a cell phone, a tablet, a computer, a server, a terminal, an appliance, a television, or a consumer good.

The generated search result (content information) could be related to known objects matching an object in a digital representation, and could be a result of a best match or a threshold match between the assigned indices and the received indices associated with the known objects. For example, it is contemplated that the content database could be programmed to perform the step of generating content information for a known object when at least 50%, at least 60%, at least 70%, at least 80%, at least 90%, or even at least 95% or more of the assigned indices match the received indices associated with the known objects. Additionally or alternatively, the content database could be programmed to perform the step of generating content information for a known object when at least 50%, at least 60%, at least 70%, at least 80%, at least 90%, or even at least 95% or more of the received indices associated with the known objects match the received indices. The threshold matching criteria could be determined empirically, especially in domain specific embodiments.

It should be appreciated that the content database could exist within the device submitting a query, or could be communicatively coupled to, but external from, the device, possibly operating as a service. For example, the disclosed infrastructure can operate as a for-fee service as a platform (PaaS), infrastructure (IaaS), software (SaaS), or other type of system.

Figure 3:
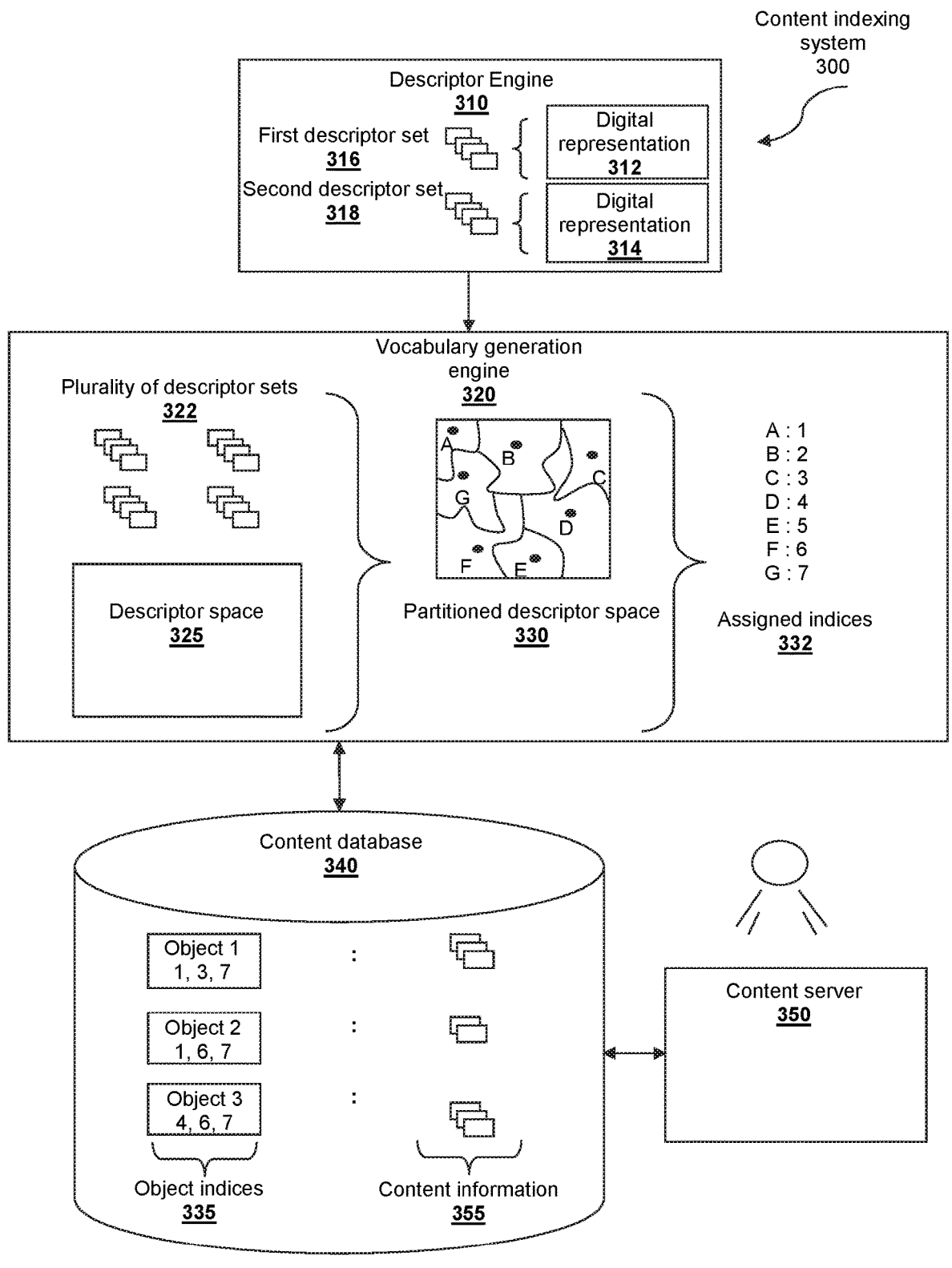
FIG. 3 illustrates a content indexing system of the inventive subject matter.

FIG. 3 illustrates an embodiment of a content indexing system 300 of the inventive subject matter. System 300 comprises a descriptor engine 310 communicatively coupled to a vocabulary generation engine 320 and content database 340. Descriptor engine 310 could be programmed to perform the step of obtaining (e.g., capture, receive, etc.) first descriptor set 316 associated with one or more digital representation(s) 312 of objects, and existing within a descriptor space. Descriptor engine 310 could further be programmed to perform the step of obtaining second descriptor set 318 associated with one or more digital representation(s) 314 of objects, and existing within the descriptor space. The descriptors of descriptor sets 316 and 318 can exist within the same descriptor space. However, it is also contemplated that some of the descriptors of sets 316 and 318 could exist in different descriptor spaces. In the example shown in FIG. 3, only a single descriptor space 325 is presented.

Vocabulary generation engine 320 could receive a plurality of descriptor sets 322 including first descriptor set 316 and second descriptor set 318 from descriptor engine 310. As illustrated in FIG. 3, each descriptor of the plurality of descriptor sets 322 exists within descriptor space 325. It should be appreciated that the plurality of descriptor sets 322 could be associated with tens, hundreds, thousands, hundreds of thousands, or even millions of objects and their corresponding digital representations.

Vocabulary generation engine 320 could then partition the descriptor space into a plurality of cells as a function of the plurality of descriptor sets 322 to generate partitioned descriptor space 330 as discussed previously. In some embodiments, each cell of the partitioned descriptor space 330 will comprise a representative descriptor (e.g., A-G, etc.) that is used as a representative of descriptors within the cell. Vocabulary generation engine 320 could further assign indices 332 (e.g., 1-7, etc.) to each cell as a function of the representative descriptor in each cell. As illustrated, assigned indices 332 include index 1 associated with representative descriptor A, index 2 associated with representative descriptor B, index 3 associated with representative descriptor C, index 4 associated with representative descriptor D, index 5 associated with representative descriptor E, index 6 associated with representative descriptor F, and index 7 associated with representative descriptor G.

Content database 340 is communicatively coupled to vocabulary generation engine 320, and could be programmed to perform the step of receiving object indices 335 (e.g., as a packet, XML, JSON, YAML, HTTP, shared memory exchange, etc.) associated with known objects, and selected from the assigned indices 332. Content database 340 could additionally or alternatively obtain content information associated with the known objects (e.g., from content server 350, and store the content information 355 on a computer readable media by indexing the content information 355 using the object indices 335. The stored content information 355 could be provided to users of client-side devices having a dictionary of the inventive subject matter as discussed previously. Of particular note, the reader should appreciate that content information 335 associated with known objects 1, 2, and 3 are retrieved based on object indices 335 rather than through descriptors sets 322. This approach is considered advantageous because a device having a high cost or limited bandwidth connection (e.g., a smart phone, etc.) to content database 340 can send queries based on object indices 335, which are a fraction of the size of typical descriptor-based queries.

Figure 4:
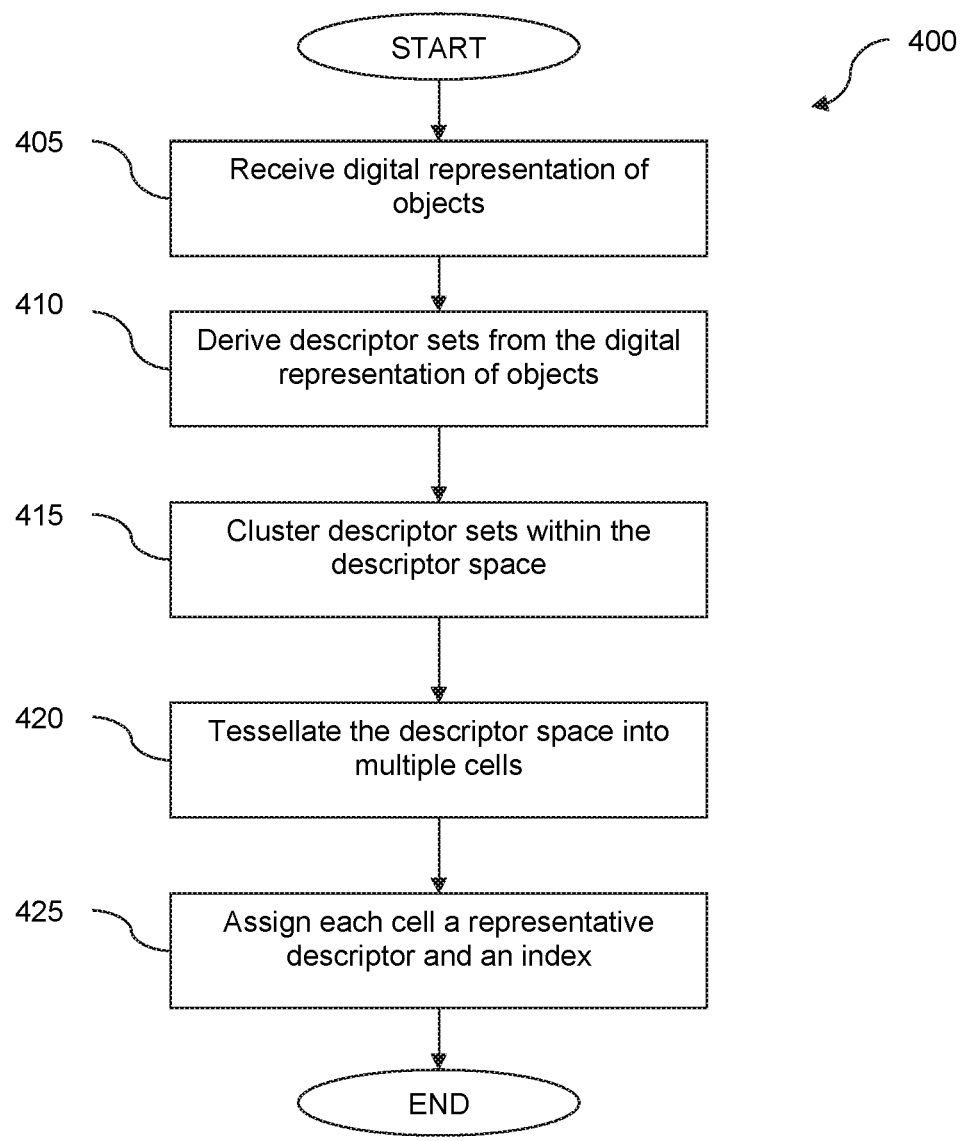
FIG. 4 illustrates a process for constructing a global vocabulary dictionary.

FIG. 4 illustrates a process 400 for constructing a global vocabulary in the global descriptor vocabulary system. The process begins with receiving (at step 405) digital representations (e.g., images, audio, video, etc.) of objects. Then, in the next step 410, the recognition module derives one or more descriptor sets within the descriptor space, where the descriptor sets are associated with the digital representation of objects. Once the descriptor sets are derived, in step 415, the vocabulary engine can generate clusters of descriptors within the descriptor space based on the representative descriptors. For example, the descriptor sets can be clustered into 5 clusters, 10 clusters, or 100 clusters. The descriptor space comprising clusters of descriptors are further tessellated into multiple cells as described in step 420. Each cluster of descriptor sets can be tessellated into another 1000 cells, 10,000 cells, 100,000 cells, 1,000,000 cells, or more. Then, in step 425, each cell can be assigned with a pair of representative descriptor and an index, which constitutes an entry for a global vocabulary.

Figure 5:
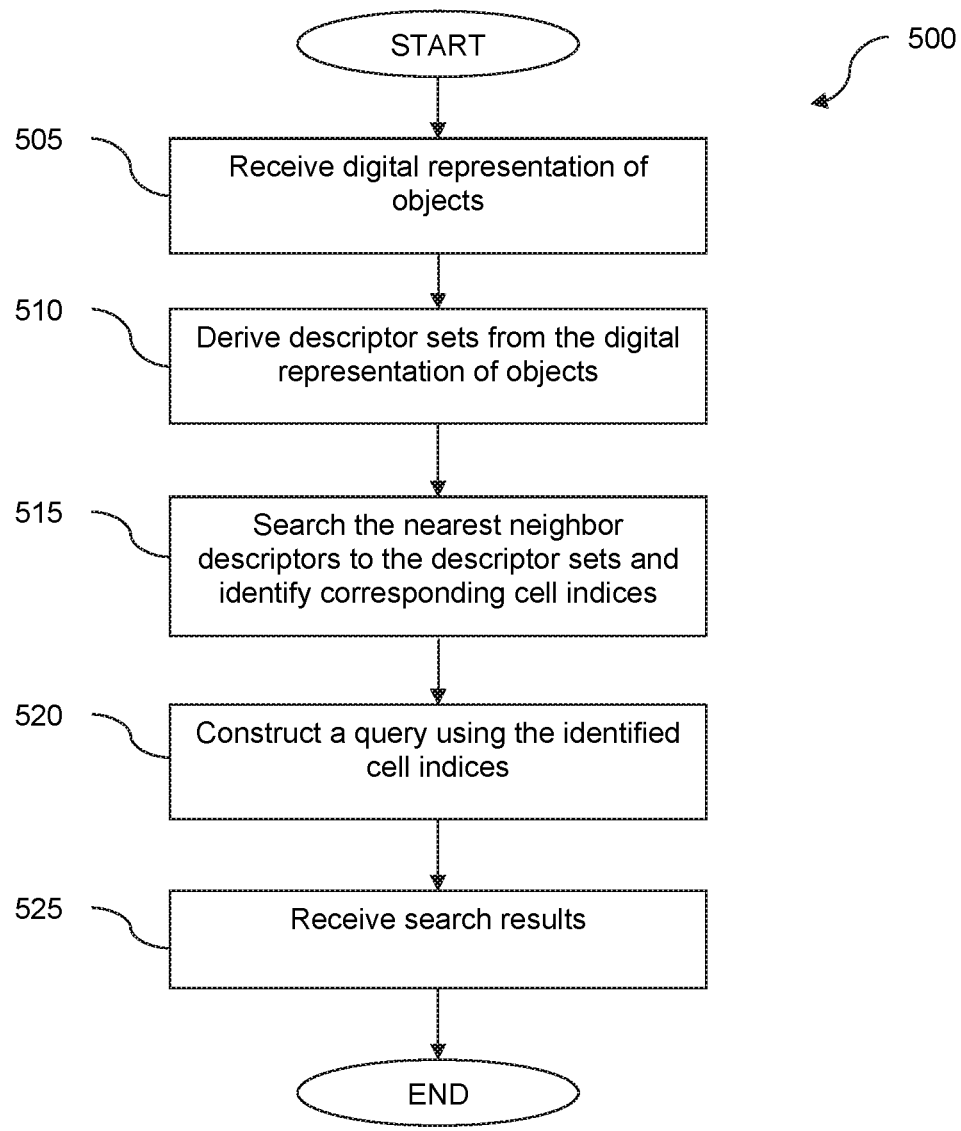
FIG. 5 illustrates a process for using the global vocabulary dictionary.

FIG. 5 illustrates a method 500 of how global vocabulary is used in the object data processing system. As described in the first step 505, the recognition module of the object data processing system receives digital representations (e.g., images, audio, video, etc.) of objects. Then, in the next step 510, the recognition module derives one or more descriptor sets within the descriptor space, where the descriptor sets are associated with the digital representation of objects. Once the descriptor sets are derived, in step 515, the descriptor sets are submitted by the content identification module to the global vocabulary module, which comprises a dictionary of descriptors. Based on the submitted descriptor sets, the global vocabulary module is programmed to perform the step of searching the nearest neighbor descriptors and corresponding cell indices associated with the nearest neighbor descriptor. In next step 520, the content identification module can construct a query targeting a content database based on the corresponding cell indices. The method continues by receiving the search results upon the submitted query in step 525.

One example that the global vocabulary system can be used to increase the accuracy of image recognition is where the image contains many features (e.g., texture-rich objects, etc.). Consider a scenario that there are two images, both of which contain a substantially similar object, a book cover. The book cover in the first image (book cover No. 1) is surrounded with many other objects (e.g., other printed materials, writing instruments, wall decoration objects, etc.). The book cover in the second image (book cover No. 2) is placed on the white wall, where there is no other objects present or placed nearby. Thus, the image of book cover No. 1 may comprise many more features than the image of book cover No. 2 depending on how closely images were captured.

When there are many features present in one image with the object of interest, two problems may occur. First, the recognition rate is reduced as the number of features increases; i.e., false positive. Second, the number of nearest items may affect the recognition rate depending on the complexity of images; i.e., latency or responsiveness. Such problems may become more significant when the number of words in the vocabulary is relatively small. For example, where there are less than 1 million words in the dictionary, only 20 words are available in one cluster, and there are more than 20 images sharing the same words, the vocabulary may be significantly biased. In such cases, the accuracy of image recognition may not be satisfactory. However, the accuracy of image recognition for book cover No. 1 can be improved in a great extent using the global vocabulary system with more than a million (e.g., 2 million, 5 million, 10 million, etc.) words associated with a corresponding number of clusters. With more words, each word can be more discriminatory to the features of object so that it can be more sensitive to recognize a texture-rich object such as book cover No. 1, and also discriminate the features of book No. 1 from the voluminous features of the surrounding objects in the image.

Thus, contrary to Philbin's assertion, increasing the size of the vocabulary (e.g., to 5 million vocabulary size) improves the accuracy, speed, and effectiveness of object recognition. Further, such a vocabulary can be considered a universal vocabulary across numerous subject matter domains. Although the size of the universal vocabulary is relatively large, it can still be stored within the memory limitations of most smart phones.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A computer-based method of instantiating an index-based image classifier system using at least one processor and at least one non-transitory computer readable medium, the method comprising:
    obtaining a plurality of image characteristic sets associated with a plurality of digital representations of objects, each image characteristic existing within a characteristic space;
    clustering the plurality of image characteristic sets into groups within the characteristic space;
    partitioning the characteristic space into a plurality of partitioned regions based on the clustered groups;
    assigning an index to each partitioned region based on the clustered groups;
    instantiating an index-based image classifier system based on the assigned indices and image characteristic sets in each partitioned region such that the image classifier system is configured to generate a set of content indices that reference corresponding partitioned regions based on an input set of image characteristics;
    receiving a query from a user device, wherein the user device is programmed to capture a digital representation of a scene including at least one object and extract at least one image characteristic set from the digital representation, the at least one image characteristic set existing within at least one characteristic space;
    generating an input set of content indices based on the at least one image characteristic set extracted from the digital representation wherein the input set of content indices is refined by suppressing common content indices; and
    retrieving at least one search result in response to the query from the user device targeting the image classifier system, wherein the query comprises the input set of content indices and one or more parameters including user device orientation, facing, and user device motion or heading, and the at least one search result comprises content information from a content database retrieved as a function of a match at a predetermined threshold level between the input set of content indices and a plurality of assigned indices associated with at least one known object.

2. The method of claim 1, wherein the plurality of image characteristic sets comprises image descriptors.

3. The method of claim 1, wherein the plurality of image characteristic sets comprises multi-modal descriptors.

4. The method of claim 1, wherein the plurality of image characteristic sets comprises a homogenous mix of descriptors.

5. The method of claim 1, wherein the image classifier system further comprises an invariant feature identification algorithm.

6. The method of claim 5, wherein the invariant feature identification algorithm comprises at least one of a SIFT, FREAK, BRISK, and DAISY algorithm.

7. The method of claim 1, wherein at least one of the plurality of image characteristic sets has its own descriptor space.

8. The method of claim 1, wherein the at least one processor is further configured to cluster the plurality of image characteristic sets using at least one of hierarchal k-mean, approximate k-mean, k-means clustering, and histogram binning.

9. The method of claim 1, wherein the at least one processor is further configured to partition the characteristic space based on Voronoi decomposition.

10. The method of claim 1, wherein the image classifier system comprises a vocabulary tree.

11. The method of claim 10, wherein the vocabulary tree comprises at least one of a k-nearest neighbor tree, a spill tree, and a k-d tree.

12. The method of claim 1, wherein the image classifier system is further configured to generate the set of content indices using a nearest neighbor classification.

13. The method of claim 12, wherein the image classifier system is further configured to calculate the nearest neighbor classification using at least one of a Euclidean distance and a Mahalanobis distance.

14. The method of claim 1, wherein each one of the assigned indices is no more than six bytes.

15. The method of claim 14, wherein each one of the assigned indices is no more than four bytes.

16. The method of claim 15, wherein each one of the assigned indices is no more than three bytes.

17. The method of claim 1, wherein the image classifier system is further configured to construct a query based on the input set of image characteristics.

18. The method of claim 1, wherein the input set of image characteristics comprise image descriptors.

19. A non-transitory computer-readable medium having computer instructions stored thereon for instantiating an index-based image classifier system, which, when executed by a processor, cause the processor to perform one or more steps comprising:
  obtaining a plurality of image characteristic sets associated with a plurality of digital representations of objects, each image characteristic existing within a characteristic space;
  clustering the plurality of image characteristic sets into groups within the characteristic space;
  partitioning the characteristic space into a plurality of partitioned regions based on the clustered groups;
  assigning an index to each partitioned region based on the clustered groups;
  instantiating an index-based image classifier system based on the assigned indices and image characteristic sets in each partitioned region such that the classifier system is configured to generate a set of content indices that reference corresponding partitioned regions based on an input set of image characteristics;
  receiving a query from a user device, wherein the user device is programmed to capture a digital representation of a scene including at least one object and extract at least one image characteristic set from the digital representation, the at least one image characteristic set existing within at least one characteristic space;
  generating an input set of content indices based on the at least one image characteristic set extracted from the digital representation wherein the input set of content indices is refined by suppressing common content indices; and
  retrieving at least one search result in response to the query from the user device targeting the image classifier system, wherein the query comprises the input set of content indices and one or more parameters including user device orientation, facing, and user device motion or heading, and the at least one search result comprises content information from a content database retrieved as a function of a match at a predetermined threshold level between the input set of content indices and a plurality of assigned indices associated with at least one known object.

20. A system comprising:
  one or more processors; and
  at least one non-transitory memory device storing software instructions that, when executed by the one or more processors, cause the one or more processors to:
    obtain a plurality of image characteristic sets associated with a plurality of digital representations of objects, each image characteristic existing within a characteristic space;
    cluster the plurality of image characteristic sets into groups within the characteristic space;
    partition the characteristic space into a plurality of partitioned regions based on the clustered groups;
    assign an index to each partitioned region based on the clustered groups;
  instantiate an index-based image classifier system based on the assigned indices and image characteristic sets in each partitioned region such that the classifier system is configured to generate a set of content indices that reference corresponding partitioned regions based on an input set of image characteristics;
  receive a query from a user device, wherein the user device is programmed to capture a digital representation of a scene including at least one object and extract at least one image characteristic set from the digital representation, the at least one image characteristic set existing within at least one characteristic space;
  generate an input set of content indices based on the at least one image characteristic set extracted from the digital representation wherein the input set of content indices is refined by suppressing common content indices; and
  retrieve at least one search result in response to the query from the user device targeting the image classifier system, wherein the query comprises the input set of content indices and one or more parameters including user device orientation, facing, and user device motion or heading, and the at least one search result comprises content information from a content database retrieved as a function of a match at a predetermined threshold level between the input set of content indices and a plurality of assigned indices associated with at least one known object.

* * * * *